US006182942B1

(12) United States Patent
Kadlicko

(10) Patent No.: US 6,182,942 B1
(45) Date of Patent: Feb. 6, 2001

(54) ACTUATOR

(75) Inventor: George Kadlicko, Bolton (CA)

(73) Assignee: Microhydraulics, Inc., Brampton (CA)

( * ) Notice: Under 35 U.S.C. 154(b), the term of this patent shall be extended for 0 days.

(21) Appl. No.: 09/041,508

(22) Filed: Mar. 12, 1998

Related U.S. Application Data

(63) Continuation-in-part of application No. 08/566,058, filed on Dec. 1, 1995, now Pat. No. 5,806,565.

(51) Int. Cl.[7] .......... F16K 31/10

(52) U.S. Cl. .......... 251/129.1; 251/129.15; 251/337

(58) Field of Search .......... 251/129.1, 129.15, 251/129.03, 337

(56) References Cited

U.S. PATENT DOCUMENTS 3,900,822 * 8/1975 Hardwick et al. .......... 335/268
4,396,037 * 8/1983 Wilcox .......... 251/129.1
4,494,098 * 1/1985 Haneda et al. .......... 335/230
4,635,683 * 1/1987 Nielsen .......... 251/129.15
4,988,074 * 1/1991 Najmolhoda .......... 251/129.15
5,234,032 * 8/1993 Kline et al. .......... 137/884
5,513,832 5/1996 Becker et al. .
5,787,915 * 8/1998 Byers et al. .......... 251/129.1
5,806,565 * 9/1998 Kadlicko .......... 137/625.63

* cited by examiner

*Primary Examiner*—Kevin Shaver
*Assistant Examiner*—Eric Keasel
(74) *Attorney, Agent, or Firm*—Ladas & Parry

(57) ABSTRACT

An electromagnetic actuator has an armature assembly including a pair of spaced plate springs to locate the magnetic core radially. The springs are formed from concentric rings interconnected by radial bridges so that flexure of the spring does not cause radial displacement. A single coil or double coil may be used and each coil is supported on a pair of bobbins. One bobbin overlies the core and the other has a recess to receive part of the core to maintain a uniform air gap between the core and bobbin.

24 Claims, 4 Drawing Sheets

ACTUATOR

This U.S. application is a Continuation in Part of U.S. Ser. No. 566,058 filed on Dec. 1, 1995, now issued as U.S. Pat. No. 5,806,565 on Sep. 15, 1998.

BACKGROUND OF THE INVENTION

The present invention relates to an electromagnetic actuator.

It is well known to utilize electromagnetic actuators, commonly referred to as solenoids, to control the operation of ancillary devices such as hydraulic valves. The principle of operation is well known and utilizes the magnetic field produced by a coil to cause displacement of a magnetizable core.

One such arrangement is shown in U.S. Pat. No. 5,513,832 to Becker in which a hydraulic valve is controlled by an armature mounted within a coil. The armature includes a magnetizable core supported on a central pin. The pin is guided for movement at one end in a conventional bearing. At the opposite end, a fluid-tight diaphragm is provided that includes a plate spring to provide a return force on the armature.

The accurate control of the ancillary device depends upon the repeatability of the response to a given input signal and the proportionality of that response. As such, the mechanical systems utilized to support an armature within the actuator have a significant effect upon the performance of the actuator and the device upon which it is acting. The coil not only imparts axial forces to the armature but also imparts radial forces. Conventional bushings of the type shown in the Becker patent are therefore susceptible to increased friction forces, particularly as the actuator wears, and radial misalignment that affects the proportionality of the response from given inputs.

It is therefore an object of the present invention to provide an actuator in which the above disadvantages are obviated or mitigated.

SUMMARY OF THE INVENTION

In general terms, therefore, the present invention provides an electromagnetic actuator having a body, an armature movable within the body, and a pair of supports extending between the body and the armature at longitudinally spaced locations to support the armature. A coil assembly is located in the body to encompass the armature. Each of the supports includes a resilient plate member extending normal to the longitudinal axis and secured to the body. Each plate member is arranged to flex in the direction of the longitudinal axis upon application of an electromagnetic force between the coil and the armature and thereby provide a bias to the armature.

Preferably the plate member is provided by a plurality of concentric rings interconnected by bridging members. The bridging members are circumferentially displaced to provide circumferentially extending beams between adjacent rings that allow for flexure of the plate upon application of an axial force.

BRIEF DESCRIPTION OF THE DRAWINGS

Embodiments of the invention will now be described by way of example only with reference to the accompanying drawings in which.

DESCRIPTION OF THE PREFERRED EMBODIMENTS

Figure 1:
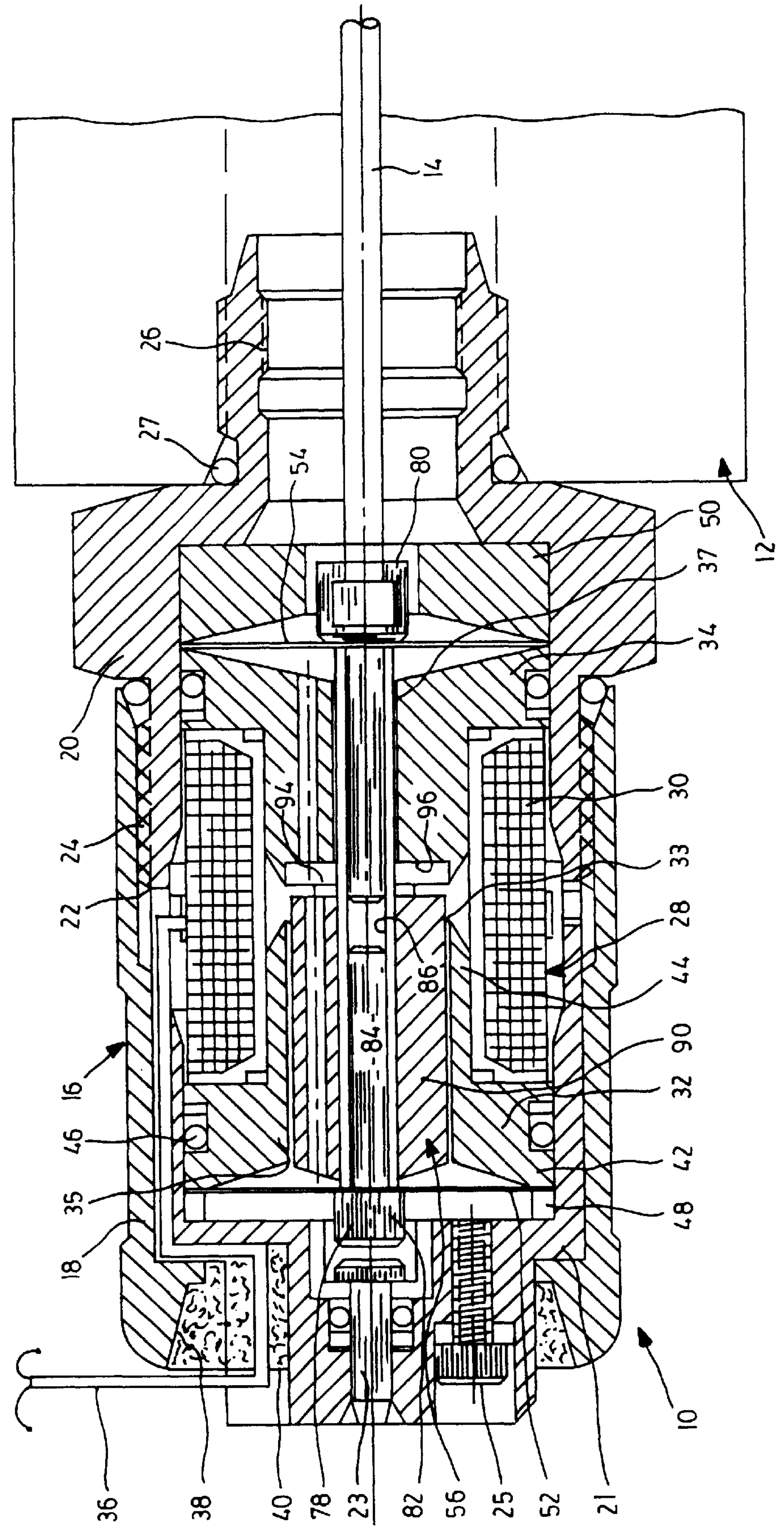
FIG. 1 is a sectional view of an actuator.

Referring therefore to FIG. 1, an electromagnetic actuator 10 is connected to a hydraulic valve 12 shown in ghosted outline. In this embodiment, the valve 12 has an operating member 14 connected to the actuator 10 as will be described below. The form of the valve 12 and the operating member 14 may be one of many known types in which axial translation of the spool 14 provides control of hydraulic fluid flowing through the valve 12. Those skilled in the art will appreciate that the exact form of the valve 12 may be chosen to suit particular requirements and need not be described further.

The actuator 10 includes a body 16 formed from a pair of nested housings 18,20. The housing 18 has an internal screw thread 22 to receive a complementary external screw thread 24 on the housing 20. An end cap 21 is provided in the housing 18 and carries a button 23 that is slidable relative to the end cap. A vent screw 25 is also provided in the end cap 21 for initial bleeding of the actuator. Housing 20 has a threaded boss 26 for connection to the valve 12 with an O ring 27 to provide a seal between the valve and the actuator.

A coil assembly 28 is located within the body 16 and includes a coil 30 and a pair of bobbins 32,34. The coil 30 is centre-wound so as to be reversible within the body 16. Power is supplied to the coil 30 by a pair of leads 36 that extend along the housing 18 to an opening 38. The opening 38 is sealed with mastic 40.

Each of the bobbins 32,34 is formed from a non-magnetic material, typically aluminum with an anodized surface coating, and includes a radial flange 42 and an axial shoulder 44 to support the coil 30. The flanges 42 extend radially to the interior of the housings 18,20 where they are sealed by O rings 46.

The bobbin 32 includes an axial bore 33 having radially inwardly directed watts 35 and the bobbin 34 has a smaller diameter axial bore 37. The coil assembly 28 is located axially within the body 16 by means of a spacer washer 48 in the housing 18 and an end plate 50 located in the housing 20. The housings 18,20 are screwed together to trap the bobbins and coil between the washer 48 and end plate 50 and thereby axially locate the coil assembly 28.

A pair of plate springs 52,54 are axially spaced within the body 16 to support an armature 56. The plate spring 52 is interposed between the washer 48 and the bobbin 32 and the plate spring 54 similarly interposed between the end plate 50 and the bobbin 34. The marginal periphery of the plate springs 52,54 is thus held adjacent the body 16 to prevent axial movement of the plate springs.

Figure 2:
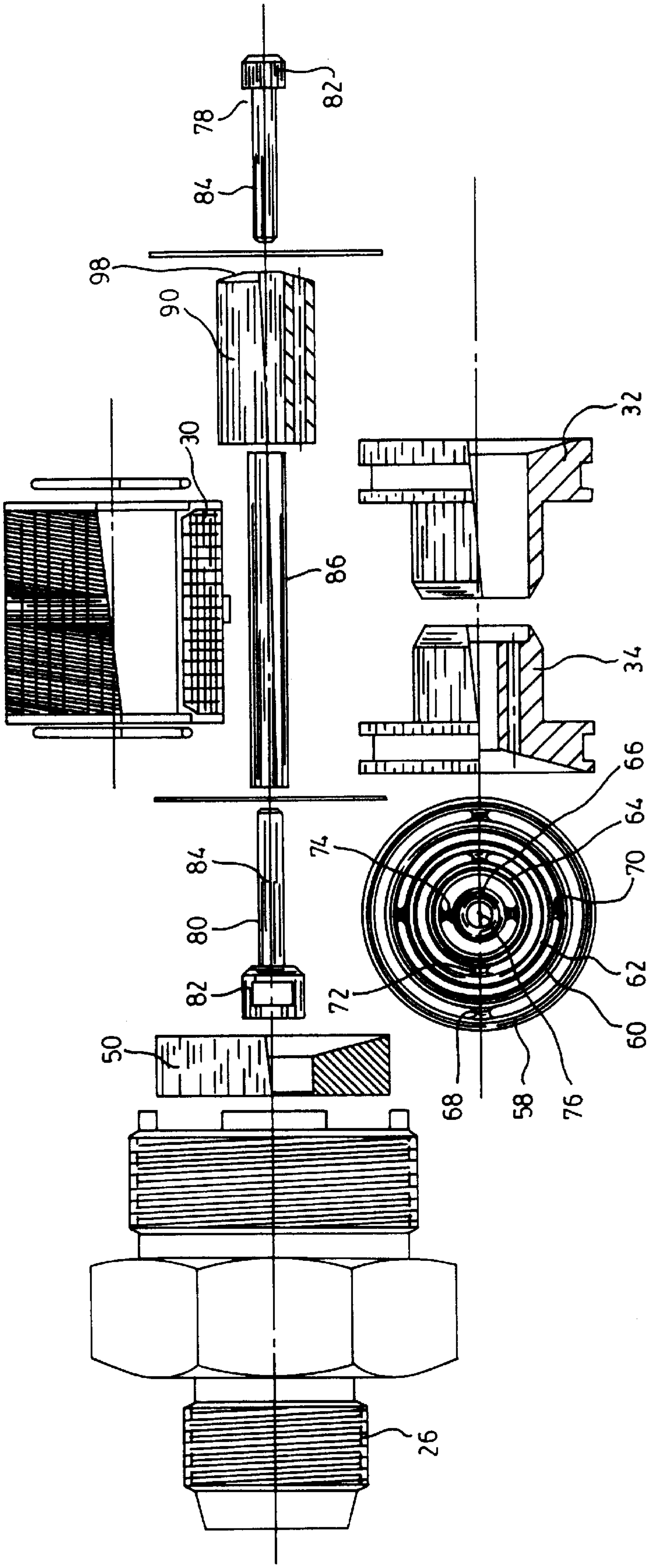
FIG. 2 is an exploded view of the actuator shown in FIG. 1.

The form of the plate springs can best be seen in FIG. 2 and as each is identical, only one need be described.

The plate spring 52 is formed from a plurality of concentric rings 58,60,62,64 and 66. The rings 58,60,62,64,66 are interconnected by radial bridges 68,70,72 and 74 which connect respective adjacent pairs of the rings 58–66. The ring 58 is connected to ring 60 by a pair of diametrically aligned bridges 68 and the ring 60 is in turn connected by a pair of diametrically aligned bridges 70 to the ring 62. It will be noted that the bridges 68,70 are circumferentially staggered by 90° so that the quadrant of the ring 60 between the bridges 68,70 forms a curved beam member. The ring 60 can thus be considered to be formed from four beams interconnected at the bridges 68,70. The rings 62,64 are similarly connected by bridges 72 which in turn are staggered relative to the bridge 70. Likewise, rings 64 and 66 are connected by bridges 74 which in turn are staggered relative to the bridges 62. An axial force applied to the centre of the plate spring 52 with the outer ring 58 held stationery will thus cause flexure of each of the beam members in each ring to allow axial displacement of the centre relative to the periphery.

An aperture 76 is provided at the centre of each of the plate springs 52,54 to receive a respective one of pin members 78,80. Each of the pin members 78,80 has an enlarged head 82 and a shank 84 that may pass snugly through the aperture 76. The shank 84 is dimensioned to be a press fit within a tube 86 that extends between the plate springs 52,54. The tube 86 is non-magnetic and maintains the plate springs in spaced relationship. The tube 86 passes freely through the bore 37 in the bobbin 34 to allow flexure of the plates 52,54.

The tube 86 carries a magnetizable core 90 that is generally cylindrical in cross-section and is formed from soft iron or similar magnetizable material. The core 90 is located within bore 33 in the bobbin 32 and is dimensioned to be freely movable within the bore 33 and maintained a small distance from the walls 35 of the bore.

The core 90 is a press fit on the tube 86 and upon insertion of the pin 78, the tube 86 is expanded radially to secure the core 90 to the tube. The core 90 and tube 86 are thus connected for unitary motion relative to the coil assembly 28.

The tube 86 also carries a non-magnetic spacer 94 which limits movement of the core 90 toward the bobbin 34. The spacer 94 is received within a counterbore 96 located in a radial face of the bobbin 34. The counterbore 96 is dimensioned so as to receive one end of the core 90 so that a predetermined clearance is provided between the radially outer surface of the core 90 and the radially inner surface of the counterbore 96. This clearance is less than the spacing provided by the spacer 94 so that a constant air gap and an enhanced proportionality is obtained.

The head 82 of the pin 80 is slotted to receive the end of operating member 14 and thus provide a direct connection between the armature 56 and the member 14. The connection is preferably such as to permit relative rotation between the spool 14 and the armature 56 about the longitudinal axis but any suitable form of connection can be utilized.

It will be appreciated that the tube 86, pins 78,80 and bobbins 32,34 are formed from non-magnetic material. In operation, therefore, the plate springs 52,54 support the armature 56 for movement along the longitudinal axis of the actuator 10 and radially locate the armature. Upon energization of the coil, an electromotive force is applied to the core 90 that induces movement along the longitudinal axis. That movement is opposed by the plate springs and results in deflection of the plate springs 52,54 into a conical configuration. The deflection is accommodated by flexure of the beams forming the concentric rings but because of the symmetrical arrangement of the bridges, the armature remains centrally located. Upon termination of the current or modulation of the current to the coil, the resilience of the plates biases the armature toward the at rest position.

The radial face 98 of the core 90 co-operates with the counterbore 96 to provide a uniform air gap during axial displacement and thereby enhance the proportionality of the actuator. As the current is modulated, the axial position of the armature relative to the housing will similarly be modulated and the operating member 14 associated with the valve moved to a corresponding position. Obviously the current may be modulated by any suitable control system to achieve the required control function in the valve.

Button 23 provides a manual override or reset to act through the armature upon the operating member if necessary in the event a control signal is not available.

Figure 3:
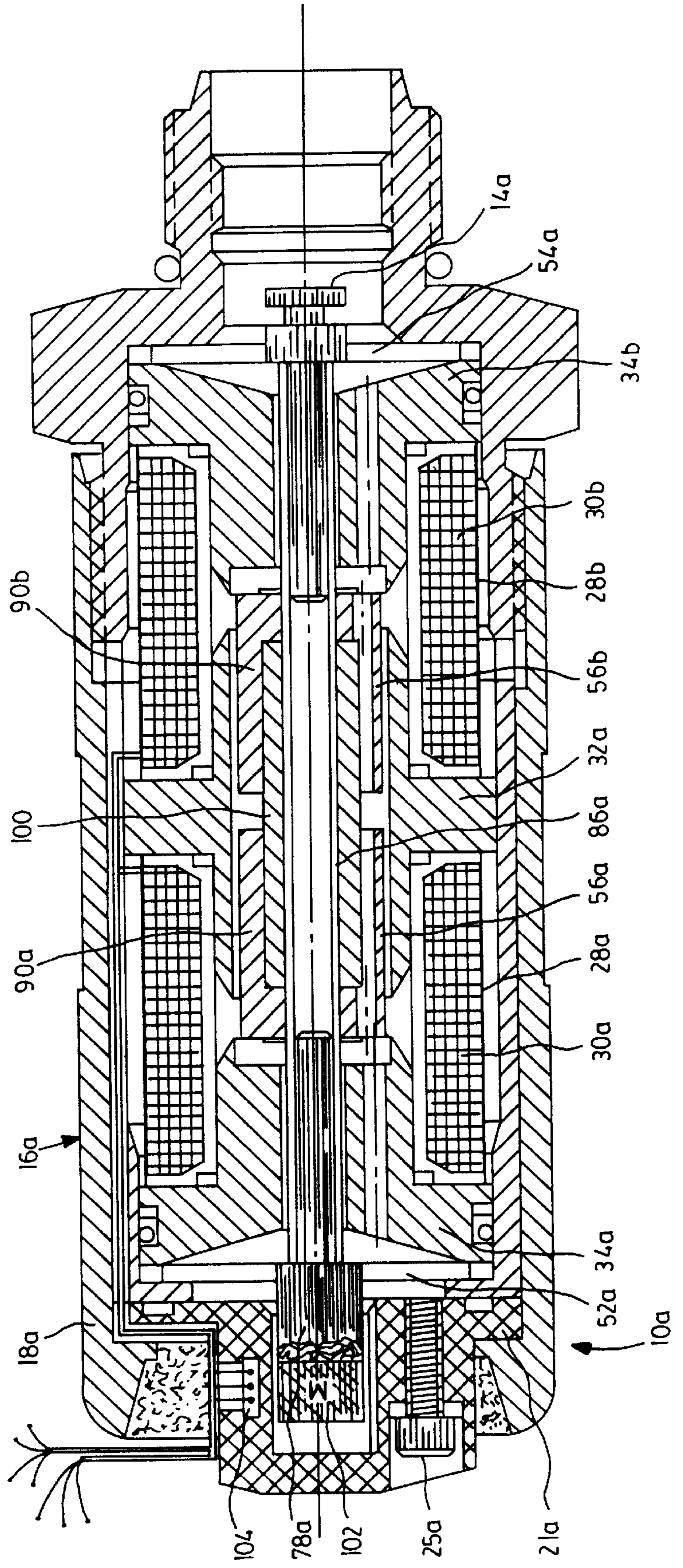
FIG. 3 is a sectional view of an alternative double-acting actuator.
Figure 4:
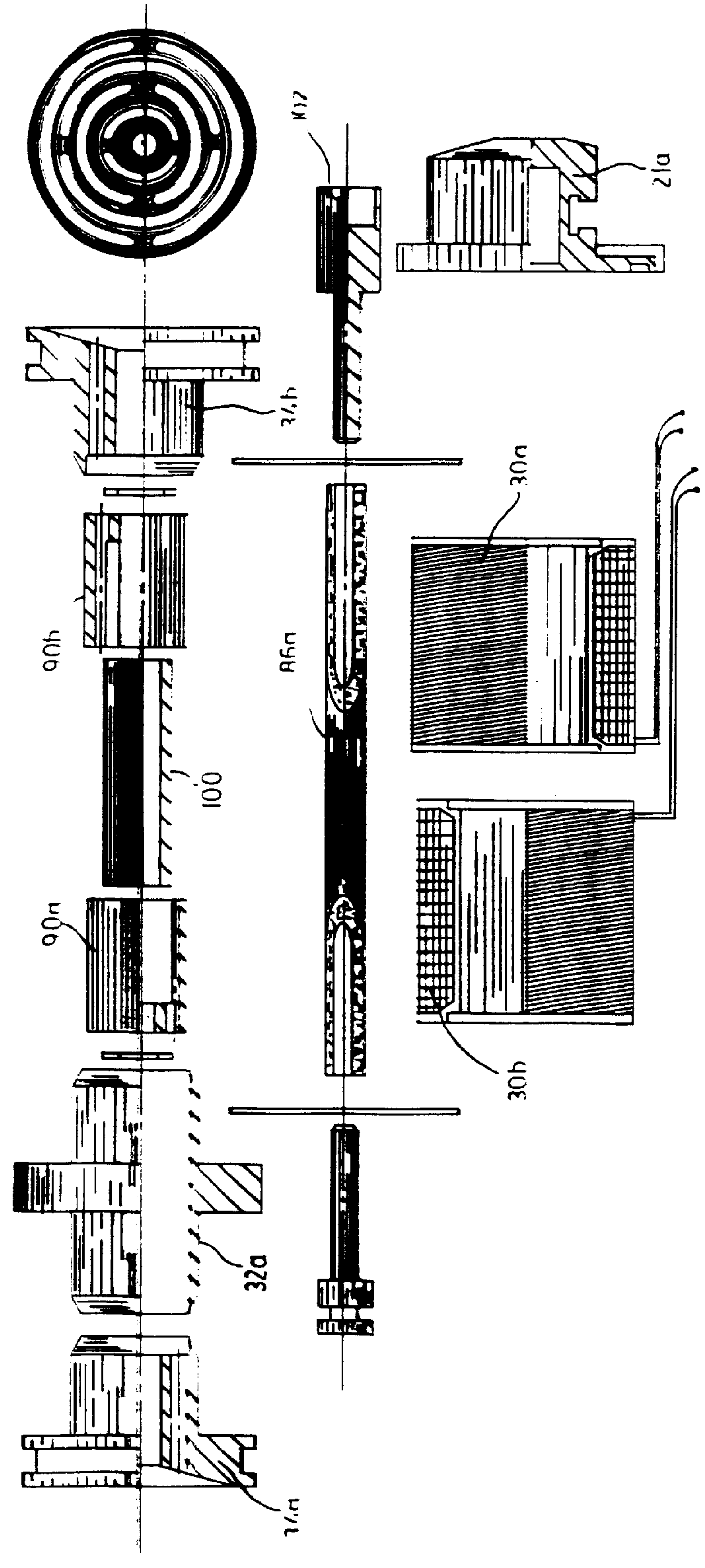
FIG. 4 is an exploded view similar to FIG. 2 of the actuator shown in FIG. 3.

A further embodiment of spool is shown in FIGS. 3 and 4 and like numerals will be used to denote like components with the suffix "a" or "b" added for clarity of description.

In the embodiment of FIGS. 3 and 4, a pair of coil assemblies **28*a*,28*b* are utilized and each co-operates with a respective armature 56*a*,56*b* mounted on a common tube 86*a*. A non-magnetic spacer 100 maintains the cores 90*a*,90*b*** in spaced relationship to maintain the separate magnetic circuits.

The bobbin **32*a* is interposed between a pair of end bobbins 34*a*,34*b* and supports each of the coils 30*a*,30*b***.

Plate springs **52*a*,54*a* support the armature 56*a*** for movement along the longitudinal axis.

The provision of the pair of coil assemblies **28*a*,28*b* permits the actuator 10*a*** to be double-acting and may thus move to either side of the neutral at rest position shown in the drawings.

It will be noted in the embodiment of FIGS. 3 and 4 that pin **78*a* is provided with a magnetic insert 102 that is positioned adjacent a Hall effect sensor 104. Movement of the armature 56*a* relative to the body 16*a* may therefore be monitored by the Hall effect sensor 104 to provide a control signal indicative of the position of the operating member 14*a***.

The Hall effect sensor 104 is shielded from the magnetic field of the coils by an internal cap 21 a located within the housing **18*a*. the cap 21 a also includes a vent screw 25*a*** to permit initial venting of the valve assembly during installation.

What is claimed is:

1. An electromagnetic actuator comprising a body, an armature movable within said body for reciprocation along a longitudinal axis, a pair of supports extending from said body to said armature at longitudinally spaced locations to support said armature and a coil assembly located in said body and encompassing said armature, each of said supports including a resilient plate member extending normal to said longitudinal axis and secured to said body, said plate member flexing in a direction of said longitudinal axis upon application of an electromagnetic force between said coil assembly and said armature, wherein said plate members include a plurality of concentric rings interconnected to one another by a plurality of radial bridges for inhibiting relative torsional displacement of said armature with respect to said body.

2. An actuator according to claim 1, wherein said radial bridges are staggered circumferentially to provide a flexible beam between adjacent ones of said concentric rings.

3. An actuator according to claim 2 wherein said adjacent concentric rings are interconnected by diametrically opposed said radial bridges.

4. An actuator according to claim 3 wherein radially adjacent ones of said radial bridges are staggered 90°.

5. An actuator according to claim 1 wherein said armature includes a tube extending between said plate members and secured thereto by pins passing through said plate members and into said tube.

6. An actuator according to claim 5 wherein said pins are an interference fit in said tube.

7. An actuator according to claim 5, wherein said tube is non-magnetic.

8. An actuator according to claim 1 wherein said coil assembly includes a coil and a pair of bobbins located at opposite ends of said coil, said bobbins extending between said coil and said body to locate said coil axially and having an axially extending shoulder to support said coil radially.

9. An actuator according to claim 8 wherein said shoulder of one of said bobbins extends between said armature and said coil.

10. An actuator according to claim 9 wherein another of said bobbins has a radial end face directed to an end face on said armature, said radial end face of said armature including a recess to receive said armature upon displacements along said longitudinal axis.

11. An actuator according to claim 10 wherein a spacer is located between said armature and said other bobbin to maintain said radial face of said armature in spaced relationship with an end wall of said recess.

12. An actuator according to claim 8 wherein said coil assembly includes a pair of coils axially spaced along said body and each of which is supported by a pair of bobbins, and said armature includes a pair of magnetizable cores spaced apart from one another and associated with respective ones of said coils.

13. An actuator according to claim 12 wherein said cores are supported on a non-magnetic tube extending between said plate members and maintained in spaced relationship by a non-magnetic spacer.

14. An electromagnetic actuator comprising a body, an armature moveable within said body for reciprocation along a longitudinal axis, a pair of supports extending from said body to said armature at longitudinally spaced locations to support said armature and a coil assembly located in said body and encompassing said armature, each of said supports including a resilient member extending normal to said longitudinal axis and secured to said body, said resilient member flexing in a direction of said longitudinal axis upon application of an electromagnetic force between said coil and said armature, thereby providing a bias to said armature, said armature including a magnetizable core mounted on a tube extending between said members and secured thereto by pins passing through said members and into said tube, wherein said pins expanding said tube radially for securing said core to said tube.

15. An actuator according to claim 14, wherein said tube is non-magnetic.

16. An actuator according to claim 14, wherein each of said resilient members includes a plurality of concentric rings interconnected to one another by a plurality of radial bridges, said radial bridges being staggered circumferentially to provide a flexible beam between adjacent ones of said concentric rings.

17. An actuator according to claim 16 wherein said adjacent concentric rings are interconnected by diametrically opposed said radial bridges.

18. An actuator according to claim 17 wherein radially adjacent ones of said radial bridges are staggered 90°.

19. An electromagnetic actuator comprising a body, an armature moveable within said body for reciprocation along a longitudinal axis, a pair of supports extending from said body to said armature at longitudinally spaced locations to support said armature and a coil assembly located in said body and encompassing said armature, each of said supports including a resilient member for locating said armature radially with respect to said body, said resilient member extending normal to said longitudinal axis and secured to said body, said member flexing in a direction of said longitudinal axis upon application of an electromagnetic force between said coil and said armature thereby providing a bias to said armature, said coil assembly including a coil and a pair of bobbins located at opposite ends of said coil, said bobbins extending between said coil and said body to locate said coil axially and having an axially extending shoulder to support said coil radially, wherein said resilient member and said axially extending shoulder facilitate a radially fixed spatial relationship between said armature and said coil assembly.

20. An actuator according to claim 19 wherein said shoulder of one of said bobbins extends between said armature and said coil.

21. An actuator according to claim 20 wherein another of said bobbins has a radial end face directed to an end face on said armature, said radial end face of said armature including a recess to receive said armature upon displacements along said longitudinal axis.

22. An actuator according to claim 21 wherein a spacer is located between said armature and said other bobbin to maintain said radial face of said armature in spaced relationship with an end wall of said recess.

23. An actuator according to claim 19 wherein said coil assembly includes a pair of coils axially spaced along said body and each of which is supported by a pair of bobbins, and said armature includes a pair of magnetizable cores spaced apart from one another and associated with respective ones of said coils.

24. An actuator according to claim 23 wherein said cores are supported on a non-magnetic tube extending between said plate members and maintained in spaced relationship by a non-magnetic spacer.

* * * * *